Figure 1B:
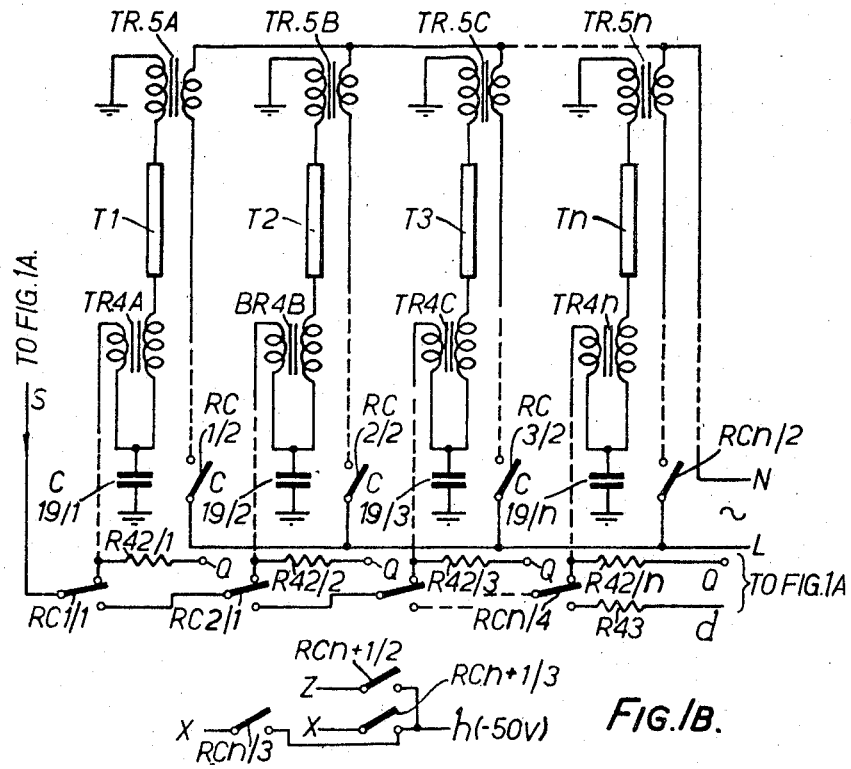

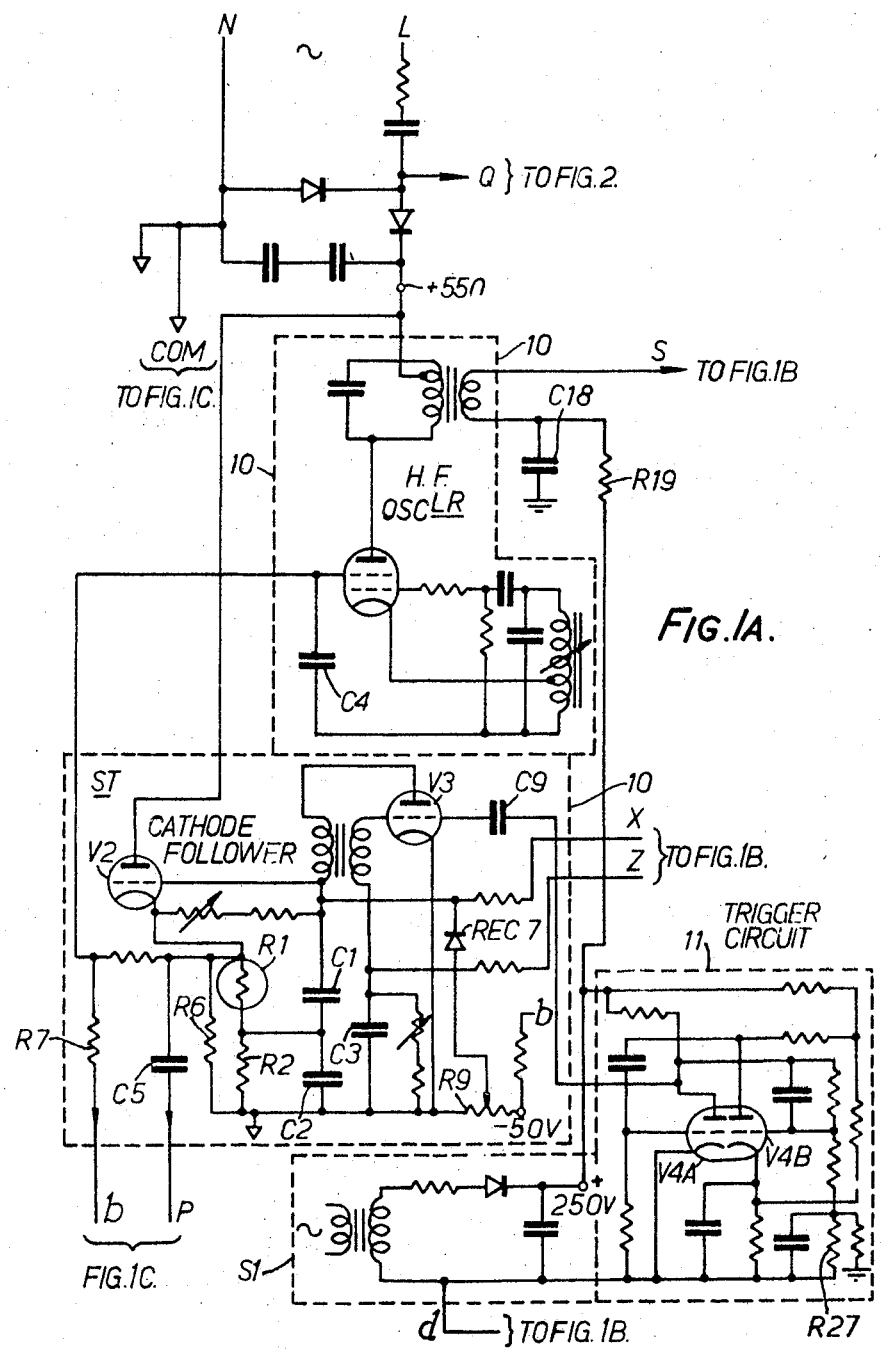

INVENTORS
ARTHUR RICHARD WARNER
DERRICK ARNOTT WARD

By Hame and Nydick
ATTORNEY

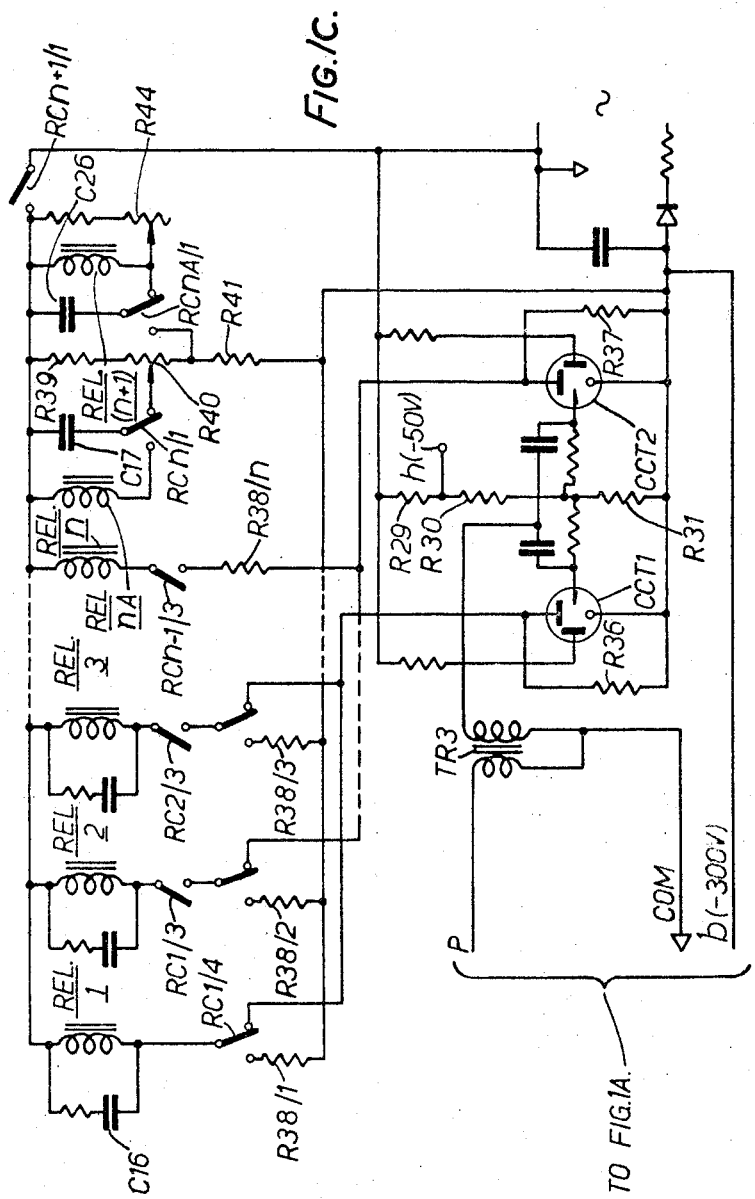

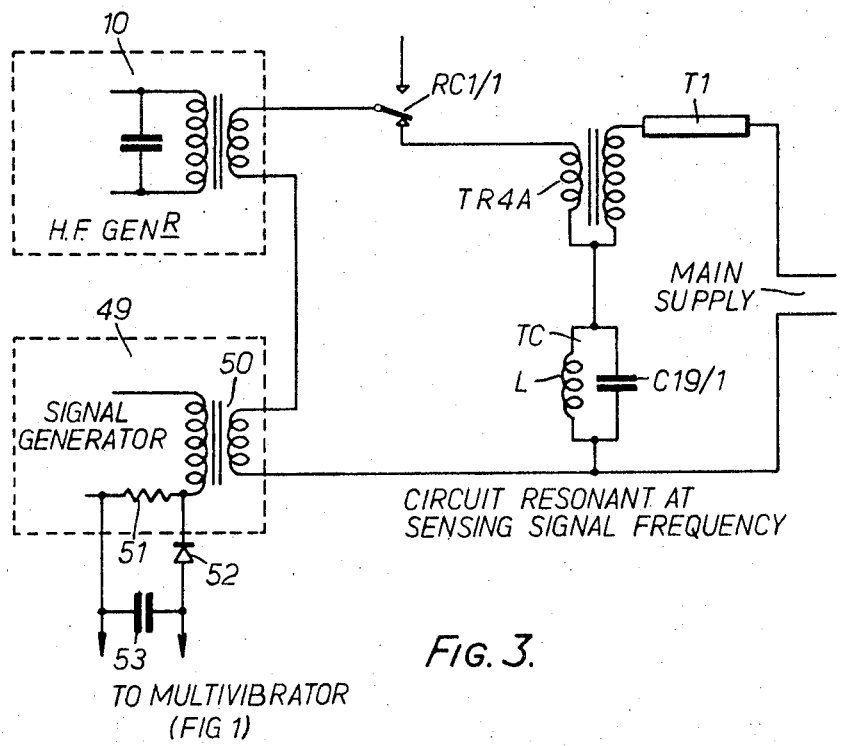

United States Patent Office 3,424,947
Patented Jan. 28, 1969

3,424,947
ELECTRIC DISCHARGE TUBE APPARATUS
Arthur Richard Warner, 23 The Vale, Chelsea, London SW. 3, England, and Derrick Arnott Ward, 30 Gravel Hill, Addington, Surrey, England
Filed July 6, 1966, Ser. No. 563,166
U.S. Cl. 315—323          10 Claims
Int. Cl. H05b 41/24, 41/18

This invention relates to electric discharge tube apparatus consisting of two or more discharge tubes, the luminous discharge in which is made to progress continuously first along the length of the first tube and then along the length of the second and any succeeding tube. The progression of the luminous discharge in each tube is produced by applying to that length of tube a high frequency voltage, of gradually increasing amplitude; the progression may be made more uniform by providing an electrode consisting of a flexible wire near and supported from the surface of the tube along its length, and connected to a point of suitable potential.

With a discharge tube apparatus of this kind, it is very desirable that the initiation of the luminous discharge in the second and succeeding tubes should be accurately timed with respect to the completion of the discharge in the immediate preceding tube, so as to give a smooth progression of the discharge along the total length of the tubes.

A system has been proposed in which full illumination of the tube is detected by the abrupt increase in the high-frequency current which occurs when the discharge extends between the electrodes. This arrangement is inconvenient in requiring means responsive to the change in high-frequency current.

The high frequency alternating current generator that produces the supply that causes the discharge to progress along the length of each tube is a relatively expensive unit; it is therefore very desirable to employ only one such generator in the complete apparatus, using the generator to supply one length of tube at a time, and to use a less expensive current source, such as an alternating current supply mains, for sustaining the discharge in a tube once it has been completely illuminated.

It is an object of the present invention to provide electric discharge tube apparatus in which a very smooth and accurately timed transition of discharge from one tube to the next can be effected.

It is a further object of the invention to provide electric discharge tube apparatus in which alternating current at the mains supply frequency is used to maintain the discharge in an electric discharge tube section, once it has been completely illuminated.

Electric discharge tube apparatus according to the invention comprises a plurality of electric discharge tubes, a main current source and a source of alternating current having a predetermined high frequency, said source operating respectively in response to applied control signals initially to reduce to the amplitude of said high-frequency current to a low value and subsequently to progressively increase said amplitude. The apparatus also includes a source of signal current having a frequency substantially less than said high frequency. The apparatus further comprises impedance means, trigger circuit means responsive to signal voltages exceeding a predetermined threshold level to develop a control signal and means applying signal voltages appearing across said impedance means to said trigger circuit. The apparatus also includes switch means operable to connect each discharge tube in a predetermined sequence initially to the high-frequency source to initiate a progressive luminous discharge therein and subsequently to said low-frequency current source to maintain said discharge, said switch means operating also to connect each said tube initially in a sensing circuit including said signal source, said tube and said impedance, whereby when said luminous discharge fills said tube to allow conduction of said signal current the signal voltage applied to said trigger circuit rises above said threshold level to cause the development of said control signal. The apparatus finally comprises switch control means operable by said control signal to actuate said switch means thereby to connect said tube to said low-frequency source and to connect the next said tube in said succession to said high-frequency current source and in said sensing circuit, and means applying said control signal from said trigger circuit to said high-frequency source and to said switch control means.

Figure 2:
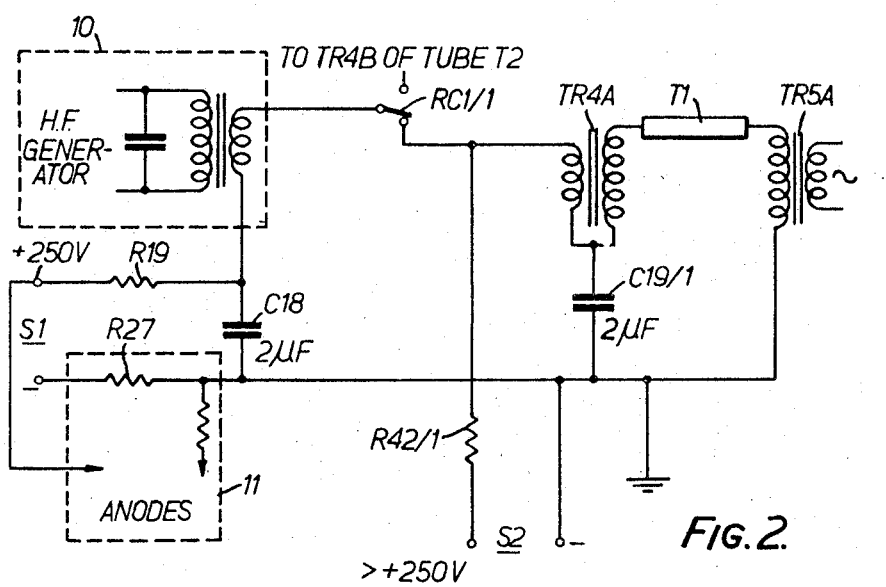

Features and advantages of the invention will appear from the following description of one embodiment thereof given by way of example, in conjunction with the drawings accompanying the provisional specification, in which:

FIGURES 1A, 1B and 1C shows a simplified circuit diagram of an apparatus such as an advertisement sign employing a number of discharge tube lengths that are to be progressively illuminated in turn, and FIGURE 2 is a fragmentary circuit diagram, of part of FIGURE 1, showing the means by which the completion of discharge in one tube length is detected and the commencement of discharge in the succeeding length of tube is initiated, FIGURE 3 is a fragmentary circuit diagram showing possible modifications of the arrangement described with reference to FIGURES 1 and 2.

In describing the operation of the apparatus shown in the drawings, it is more convenient first to refer to FIGURE 4; like parts in the two figures bear like references. In FIGURE 2, block 10 represents a high frequency generator the amplitude of the output voltage of which rises with time, and after a given time interval falls to a low value, when the cycle of output is repeated. The output from this generator is applied through contacts RC1/1 to the primary winding of a high frequency transformer TR4A, the circuit being completed through two capacitors C18 and C19/1. The secondary winding of transformer TR4A is connected to a discharge tube T1, the circuit being completed through the secondary winding of a mains supply transformer TR5A and capacitor C19/1. Conveniently, the output of generator 10 is at low impedance, and an appropriate voltage stepup obtained at transformer TR4A.

With this arrangement, the gradually increasing output of the generator 10 will cause the discharge in tube T1 to extend progressively along the length of the tube until the tube is finally illuminated along the whole of its length. It is at this point that it is desired that the generator 10 should be applied to supply the next tube of the series, and the tube T1 maintained by an alternating current. It is not possible satisfactorily to achieve this by a mere timing operation; there are certain variable factors, such as mains voltage fluctuations, temperature and other weather conditions which will affect timing interval. The present arrangement makes use of the fact that as soon as the discharge in tube T1 extends completely between the electrodes at the ends of the tube, the direct current resistance presented between the electrodes of the tube changes. Accordingly, when this happens a direct current path through tube T1 is also established, from a source S1, through a resistor R19, the generator 10, contacts RC1/1, the two windings of transformer TR4A, tube T1, the secondary winding of transformer TR5A, and a further resistor R27. Thus, as soon as the discharge extends between the electrodes of tube T1, a current will flow in this direct current circuit last described, producing a voltage drop across resistor R27. This is used to control a trigger unit consisting of a multivibrator 11. The multivibrator responds to this voltage drop and is used to operate via a blocking oscillator and trigger tube combination a relay which changes over its contacts RC1/1, to connect the generator 10 to the next tube of the series; at the same time voltage is applied to the primary winding of the transformer TR5A, so to maintain the tube T1 with voltage from the mains supply.

This sequence of operation is continued until all the tubes of the series are illuminated, when the system is caused to revert to its initial condition, with all the tubes extinguished.

Capacitor C18 will initially be charged to approximately 250 volts and to prevent this capacitor discharging into capacitor C19/1 when relay contacts RC1/1 change over to the position shown C19/1 is adapted to be charged to the same or a slightly higher voltage from a second source S2, through the resistor R42/1.

Turning now to the more complete circuit diagram shown in FIGURES 1A, 1B and 1C the complete sign of the required length is made up of tube sections T1 ... T$n$; these tube sections have associated with them respectively, high frequency transformers TR4A ... TR4$n$ and mains frequency supply transformers TR5A ... TR5$n$. The primary windings of the latter transformers are controlled by the contacts RC1/2 ... RC$n$/2, these being the contacts of relays REL1 ... REL$n$. The relay contacts are shown in their normal position.

When the apparatus is switched on, the first tube is connected to the high frequency generator over the low impedance transmission line and the discharge in this tube progresses increasingly along the length of the tube; this action is sometimes described as the tube "writing" or being "written out."

The circuit of FIGURES 1A, 1B and 1C includes numerous other components, including resistors and capacitors, which are not specifically mentioned, but the function of which is considered to be apparent to those skilled in the art, without further description.

As soon as tube T1 is fully ionised, a small direct current passes through resistance R27 as above explained. The resulting volt drop in R27 applies a positive bias to the grid of the normally non-conducting valve V4B of the monostable multivibrator 11, which is brought into conduction, and the normally conducting valve V4A is cut off. The resulting positive pulse at the anode of V4A is applied through capacitor C9 to the grid of a blocking oscillator valve V3 of a saw tooth generator ST forming part of generator 10. The H.F. output thereupon rapidly falls to zero in accordance with the trailing edge of the saw tooth. At the same time as this falls to zero a negative pulse is derived from the cathode of the cathode follower V2 and applied over connection P and capacitor C5 to the pulse transformer TR3 where it is converted to produce a positive pulse which is applied to both the trigger electrodes of the cold cathode trigger tubes CCT1 and CCT2. This initiates anode to cathode discharge of CCT1, causing relay REL1, in its anode circuit, to pull in. The four sets of contacts controlled by this relay thereupon carry out the following switching operations:

RC1/4 changes over to transfer the winding of REL1 from CCT1 to the supply terminal $b$ through resistor R38/1, to hold in the relay, and to open the anode circuit of tube CCT1 which accordingly extinguishes; RC1/2 closes to switch the primary of transformer TR5A to the mains supply to maintain illumination of tube T1; RC1/1 changes over to transfer the H.F. output of generator 10 to tube T2 over contacts RC2/1, so that the tube immediately commences to write; and RC1/3 closes in the circuit of relay REL2 to allow CCT2 to fire on arrival of the next pulse to its trigger.

It will be noted that (a) although the pulse is always applied to the trigger electrodes of both CCT1 and CCT2, only one tube can fire at any time, because the anode circuit of the other is open-circuited by a relay contact, (b) CCT1 and CCT2 fire alternately, (c) at any time only one relay is connected in the anode circuit of CCT1 or CCT2 as the case may be, and thus only one relay can operate when a trigger pulse is applied to the trigger tubes.

As soon as tube T2 is ionised fully along its length, a similar sequence of operations occurs, but this time CCT2 fires and REL2 operates. This sequence is repeated in turn on all relays in succession up to and including REL($n$–1).

When relay REL($n$–1) pulls in, tube T$n$ commences to write and when it is fully ionised, the sensing device initiates the series of pulses as before, and CCT1 (or CCT2 if $n$ is an even number) fires. In this instance, however, the appropriate trigger tube is held in conduction; relay REL$n$ in its anode circuit pulls in and in conjunction with the further relay REL$n$A carries out the following switching operation:

Contacts RC$n$/1 change over to connect the capacitor C17 to the coil of REL$n$A, which pulls in; at this time C17 has been charged from an adjustable tap on the voltage divider, formed by resistors R39, R40 and R41, connected across the negative D.C. supply, of about 300 v., at terminal $b$. Contacts RC$n$A/1 change over to connect C26 to a fixed point on the voltage divider across the supply at terminal $b$, at about 250 v.

Contact RC$n$/2 closes to connect the primary winding of transformer TR5$n$ to the 50 c./s. supply. All the tubes are now fully illuminated, fed from 50 cycles A.C.

RC$n$/3 closes to apply a negative bias of about 50 v. from terminal $h$, and over connection $x$, to the grid of the cathode follower V2 of the saw tooth generator to cut off the sawtooth waveform and thus to hold the output of the H.F. generator at zero. A suitable bias source for the grid is at point $h$ on the voltage divider formed by resistors R29, R30 and R31.

RC$n$/4 changes over to connect the H.F. supply line through resistor R43 to the negative terminal $d$ of the independent 250 v. supply included in the multivibrator unit 11 in order to prevent the multivibrator from oscilating.

When C17 has discharged sufficiently through the coil of REL$n$A, the relay releases; RC$n$A/1 changes over to connect the charged capacitor C26 to REL($n$+1) which pulls in. Thereupon RC$n$+1/1 opens to disconnect the trigger tubes and all relays from the common line. All relays except REL($n$+1) release, the power supply transformers are switched off, and all tubes of the sign are extinguished. This marks the end of the "on" period, which it will be seen is adjustable by the potentiometer R40, and the beginning of the "off" period of the sign. RC$n$+1/3 closes to apply negative bias over lead $x$ to the grid of the cathode follower, and thus to hold the output of the H.F. generator at zero. The capacitor C3 in the grid circuit of the blocking oscillator must be maintained at an adequate negative potential during the "off" period, otherwise the natural cycle time of the saw tooth generator will be too short to allow T1 to be fully written out when the next writing cycle begins, with the result that the H.F. will be transferred to T2 when T1 is only partly written out. The required negative potential is applied over contacts RC$n$+1/2 and lead $z$.

When capacitor C26 has discharged sufficiently REL($n$+1) releases and its contacts then resume their normal positions. The contacts of all relays are then in their "normal" positions as in FIGURE 1; T1 recommences to write and the complete cycle of operations is repeated. It will be seen that the "off" period is adjustable by the variable resistor R44 which partly controls the discharge rate of C26.

When the H.F. supply is switched to a tube, say T1 (FIGURE 1) C18 is in shunt with C19/1. If C19/1 is uncharged, or charged to a potential less than that of C18, C18 will discharge into C19/1, and a charging current will flow from the source S1 through R27. The resulting volt drop in R27 may cause the multivibrator to oscillate, and pulses to be applied to the grid of the blocking oscillator in rapid succession. At faster writing speeds the anode voltage of the blocking oscillator will rise rapidly and may reach a value at which blocking can occur before the pulses have ceased. Owing to the high amplitude of the pulses applied to its grid, the blocking oscillator will block at a relatively low anode voltage, and the tube will therefore extinguish before it is fully written out. This is avoided by maintaining C19/1 at a potential preferably slightly higher than that of S1 at about say 275 v.

The biased diode REC7 serves to limit the negative potential to which C1 can charge when the blocking oscillator V3 blocks, to ensure that the H.F. output begins to rise again immediately when it has been reduced to zero and transferred to the next tube, so giving a uniform writing rate between tube sections. The potentiometer R9 controls the negative bias applied to the anode of the diode REC7, and is adjusted to limit the peak potential to which C1 is charged, to the value required.

It is also necessary to discharge the screen grid decoupling capacitor C4 and the capacitor C2 in generator 10 very rapidly. Rapid discharge of C4 is provided by the resistor R6 of relatively low value, which shunts the high value resistors R1 and R2, and is further assisted by the negative voltage from terminal $b$ applied through R7.

The apparatus described has several practical advantages. For example, the only components which need to be located at the site of the sign are the high frequency and low frequency transformers, and the remaining units can be located remotely of the sign, where convenient. No additional wiring is required between the sign proper and the remotely located apparatus. Further, the apparatus located away from the sign can be of standard construction, and can be readily adapted to signs of different sizes. Apart from the improvement in operation of the sign, as regards the uniform writing rate, which can be easily controlled by a small component, the operation of the sign is not interrupted if a tube fails. The reason for this is that if a tube should break or fail, the blocking oscillator will block at the end of its normal cycle time, and trigger the trigger tube to actuate the appropriate relay. Again, both the "on" and "off" periods are easily adjustable by means of small components.

The apparatus described can be extended to the use of further tube sections at relatively small additional cost.

The embodiment of the invention described can be modified in a variety of ways, but in particular it is possible to use other than the change in a direct current as the parameter for sensing that one tube length is completely illuminated; it is necessary only that the indication afforded should be distinguishable from the high frequency current supplied to the tube. For example, a lower frequency alternating current can be used, though the direct current is very convenient, in being available and very easily distinguished from the supply current.

Modifications of the arrangements described with reference to FIGURES 1 and 2 are also possible. The main supply need not be an alternating-current supply, but may comprise a direct-current source. In addition the signal voltage source may be an alternating-current source of which the frequency is readily distinguished from that of the high-frequency source. FIGURE 3 shows both these modifications.

In FIGURE 3, tube T1 is initially energised by current from high-frequency generator 10 applied to it by way of high-frequency transformer TR4A. The primary circuit of this transformer is completed by way of the parallel combination of an inductor L and a capacitor C19/1, forming a resonant circuit TC tuned to the signal frequency, and the secondary winding of the output transformer 50 of a signal-frequency generator 49. In the condition where the tube T1 is not fully ionised, the sensing signal generator 49 passes negligible current due to the high impedance of the resonant circuit TC, thus only a very small part of the sensing signal voltage is developed across the resistor RS. When the tube T1 is fully ionised from the high frequency generator 10, the tube T1 provides a shunt across the resonant circuit TC, thus providing an additional path for current from the sensing signal generator. Current from the latter thus increases, resulting in a proportional increase in the voltage across a resistor 51 connected in the primary circuit of transformer 50 a potential which is rectified by a diode 52 thus developing across a capacitor 53 a potential which is applied to the grid of valve VB4 in the trigger circuit 11 of FIGURE 1 to initiate the trigger action. The remaining operation of the modified circuit follows that of FIGURE 1, relay RC1 being operated, whereupon contact RC1/1 connects the high-frequency generator 10, the signal generator 49 and the resonant circuit TC to the next tube in sequence.

We claim:
1. In electric discharge tube apparatus comprising a plurality of electric discharge tubes, oscillator means generating high frequency current of increasing amplitude, switch means operable to connect said high frequency current sequentially to each said tube, a source of main current; further switch means operable to connect said main current to each said tube; the improvement which consists in providing a source of sensing current distinguishable from said high-frequency current and from said main current; together with means responsive to the change in said sensing current which results from full ionization of a said tube to effect sequential switching of said high frequency and main current sources to said tube.

2. In an electric discharge tube apparatus as claimed in claim 1 wherein said means responsive to said sensing current comprises: impedance means; trigger circuit means responsive to applied signal voltages exceeding a predetermined threshold level to develop a control signal; means applying signal voltages appearing across said impedance to said trigger circuit; switch means operable sequentially to connect each said discharge tube initially to said high-frequency source to initiate a progressive luminous discharge therein and subsequently to said main current source to maintain said discharge, said switch means operating also to connect each said tube initially in a sensing circuit including said signal source, said tube and said impedance, whereby the signal voltage applied to said trigger circuit increases above said predetermined threshold level when said luminous discharge fills said tube, switch control means operable by said control signal, said switch control means actuating said switch means to connect said tube to said main current source and to connect the next tube in said succession to said high-frequency source and in said sensing circuit; and means applying said control signal from said trigger means to said high-frequency source and to said switch control means.

3. The discharge tube apparatus claimed in claim 1 wherein said signal source is a source of direct current.

4. The discharge tube apparatus claimed in claim 1 wherein said signal source is a source of alternating current of frequency differing substantially from that of said high-frequency source.

5. The discharge tube apparatus claimed in claim 1 wherein said main supply is an alternating current line.

6. The discharge tube apparatus claimed in claim 1 wherein said high-frequency current source includes a voltage-controlled oscillator generating said high-frequency current; a blocking oscillator saw-tooth voltage generator generating a rising saw-tooth voltage; means applying said saw-tooth voltage to correspondingly control the output current amplitude of said oscillator; and means applying said control signal to terminate the rise of said saw-tooth voltage.

7. The discharge tube apparatus claimed in claim 1 wherein said switch means comprises a plurality of relay devices equal in number to the number of said plurality of tubes each said relay having a first contact controlling the connection of a said tube to said high-frequency generator, a second contact controlling the connection of said tube to said main supply, and third and forth contacts controlling the actuation of the next in sequence of said relays.

8. The discharge tube apparatus claimed in claim 1 wherein said switch-control means comprises first and second trigger means, a first actuating circuit for any selected one of a first set comprising alternate ones of said relays including a current source, said relay and a first of said trigger means, a second actuating circuit for any selected one of a second set comprising the remaining ones of said relays including said current source, last said relay and the second of said trigger means, and means applying said control signal to said trigger means.

9. Apparatus as claimed in claim 1 wherein said high-frequency source is a low-impedance source and comprising a like plurality of high-frequency transformers, each said transformer having a low-impedance primary winding and a high-impedance secondary winding connected to an individual one of said discharge tubes, said switch means being operable to connect the primary windings of said transformers selectively to said high-frequency source.

10. Apparatus as claimed in claim 9 wherein said main supply source is an alternating current line, comprising individual mains-frequency transformers having a primary winding and a secondary winding associated with each said discharge tube, and circuit means connecting said secondary winding of said mains transformer in an alternating-current series circuit including said discharge tube, and the secondary winding of a said high-frequency transformer and said impedance means.

References Cited

UNITED STATES PATENTS 2,892,125   6/1959   Warner et al. _____ 315—323

JOHN W. HUCKERT, *Primary Examiner.*

J. R. SHEWMAKER, *Assistant Examiner.*

U.S. Cl. X.R.

315—166, 172, 174, 176, 210, 252, 255, 277